United States Patent
Reid et al.

(10) Patent No.: US 12,434,635 B2
(45) Date of Patent: Oct. 7, 2025

(54) TRAILER BACKUP CAMERA SYSTEM

(71) Applicant: R.A. PHILLIPS INDUSTRIES, INC., Santa Fe Springs, CA (US)

(72) Inventors: Alexander Reid, Huntsville, AL (US); Daniel William Forthoffer, Birmingham, MI (US); Peter John Pless, South Ogden, UT (US)

(73) Assignee: R.A. Phillips Industries, Inc., Irvine, CA (US)

( * ) Notice: Subject to any disclaimer, the term of this patent is extended or adjusted under 35 U.S.C. 154(b) by 52 days.

(21) Appl. No.: 18/151,362

(22) Filed: Jan. 6, 2023

(65) Prior Publication Data

US 2023/0219501 A1    Jul. 13, 2023

Related U.S. Application Data

(60) Provisional application No. 63/297,627, filed on Jan. 7, 2022.

(51) Int. Cl.
| | |
|---|---|
| *B60R 1/26* | (2022.01) |
| *B60Q 1/00* | (2006.01) |
| *B60Q 1/30* | (2006.01) |
| *B60R 11/00* | (2006.01) |
| *B60R 11/04* | (2006.01) |
| *H04N 7/18* | (2006.01) |

(52) U.S. Cl.
CPC ............ *B60R 1/26* (2022.01); *B60Q 1/0035* (2013.01); *B60Q 1/30* (2013.01); *B60R 11/04* (2013.01); *H04N 7/183* (2013.01); *H04N 7/188* (2013.01); *B60R 2011/004* (2013.01)

(58) Field of Classification Search
CPC ...... B60R 1/26; B60R 11/04; B60R 2011/004; B60R 2300/404; B60R 2300/406; B60Q 1/0035; B60Q 1/30; B60Q 2900/30; B60Q 1/0023; B60Q 1/305; B60Q 2900/10; H04N 7/183; H04N 7/188
See application file for complete search history.

(56) References Cited

U.S. PATENT DOCUMENTS

| | | |
|---|---|---|
| 9,266,405 B1 * | 2/2016 | Blanchard .......... B60H 1/00457 |
| 10,311,315 B2 | 6/2019 | Drazan et al. |
| 10,336,257 B2 | 7/2019 | Lewis et al. |
| 10,532,698 B2 | 1/2020 | Potnis et al. |
| 10,700,773 B1 | 6/2020 | Hubbell et al. |
| 10,710,503 B2 | 7/2020 | Elliott |

(Continued)

FOREIGN PATENT DOCUMENTS

| | | | |
|---|---|---|---|
| CN | 201412748 Y | * | 2/2010 |
| JP | 2011178319 A | * | 9/2011 |

*Primary Examiner* — Michael Lee
(74) *Attorney, Agent, or Firm* — Womble Bond Dickinson (US) LLP

(57) ABSTRACT

A backup camera system includes a housing configured to be mounted to a back of a trailer at a location of a center marker light of the trailer and having a rear surface offset from and facing away from the trailer, a camera at the housing and configured to capture a rear view of the trailer, a first light at a center of the rear surface of the housing, a second light at the rear surface of the housing and offset from the first light, and a controller within the housing and configured to selectively couple the first light or the second light to a wiring of the center marker light of the trailer.

9 Claims, 5 Drawing Sheets

(56) References Cited

U.S. PATENT DOCUMENTS

| | | | |
|---|---|---|---|
| 11,001,231 B1 | 5/2021 | Hedman et al. | |
| 11,064,165 B2 | 7/2021 | Kiliman | |
| 11,072,284 B2 | 7/2021 | Windeler et al. | |
| 11,075,489 B2 | 7/2021 | Kageta | |
| 11,082,817 B2 | 8/2021 | Matus et al. | |
| 11,590,886 B1* | 2/2023 | Frank | B60Q 1/5035 |
| 2010/0277935 A1* | 11/2010 | Endo | B60Q 1/302 348/148 |
| 2011/0013020 A1* | 1/2011 | Jo | B60R 1/26 348/148 |
| 2015/0228066 A1* | 8/2015 | Farb | G06V 20/58 348/148 |
| 2016/0107571 A1* | 4/2016 | Dellock | H04N 7/183 348/148 |
| 2016/0186953 A1* | 6/2016 | Hogrefe | F21S 41/151 362/517 |
| 2016/0355134 A1* | 12/2016 | Leary | B60R 11/04 |
| 2017/0088072 A1* | 3/2017 | Curtis | G08B 31/00 |
| 2019/0184910 A1 | 6/2019 | Bazille | |
| 2020/0254931 A1 | 8/2020 | Herman | |
| 2021/0031686 A1* | 2/2021 | Pearson | H04N 23/54 |
| 2021/0042961 A1* | 2/2021 | Greenwood | G06T 7/70 |
| 2021/0335130 A1 | 10/2021 | Messer | |
| 2021/0341929 A1 | 11/2021 | Gali et al. | |

\* cited by examiner

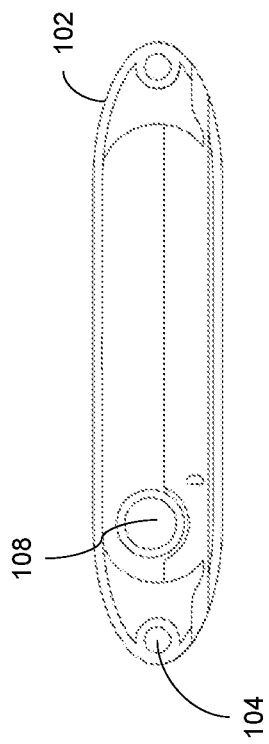
FIG. 2D
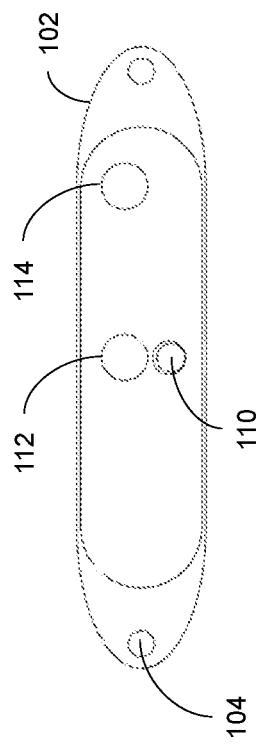
FIG. 2C
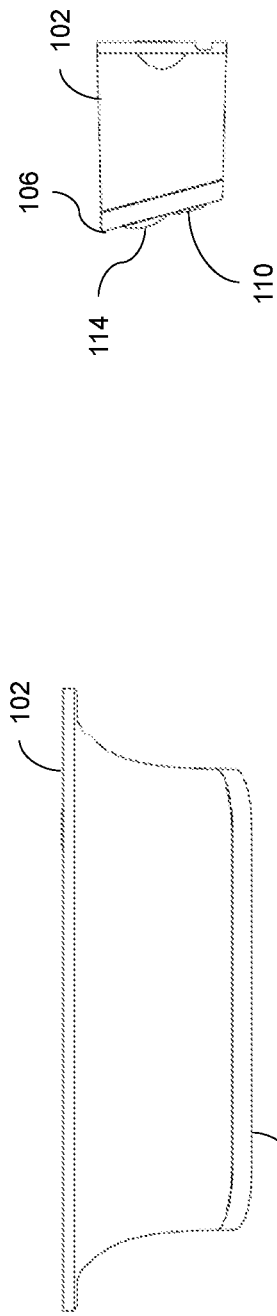
FIG. 2F
FIG. 2E

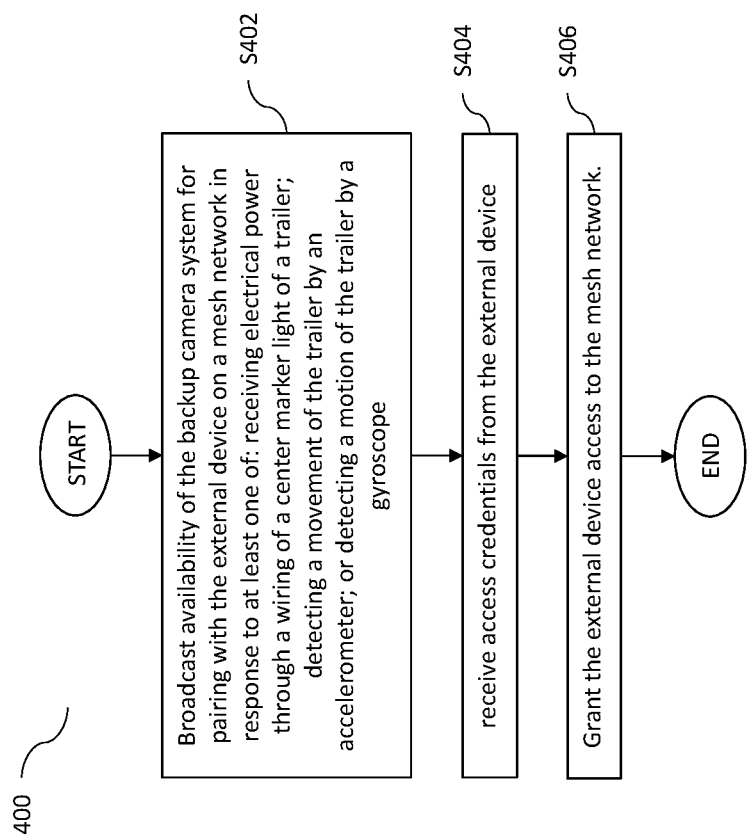

TRAILER BACKUP CAMERA SYSTEM

CROSS-REFERENCE TO RELATED APPLICATION(S)

This application claims priority to, and the benefit of, U.S. Provisional Application No. 63/297,627 ("TRAILER BACKUP CAMERA SYSTEM"), filed on Jan. 7, 2022, the entire content of which is incorporated herein by reference.

FIELD

Aspects of the present invention relate to a vehicle backup camera system and a method of using the same.

BACKGROUND

With recent advancements in electronics, the number of advanced safety features included in vehicles has increased. One such safety feature is the back-up camera system that provides the driver a clear rearview of other vehicles or elements that are situated behind the vehicle. Such a system is of particular interest in the field of heavy duty trucking as the large size of the trailer often prevents the driver from being able to see the back of the vehicle using a rearview mirror or side mirrors. Conventional back up camera solutions generally include mounting one or more rearview cameras to the rear of the trailer, which provide the driver a full view of everything from the back of the trailer to the entire surrounding area.

Current semi-truck, trailer mounted backup cameras of the related art have incorporated dedicated receivers mounted in the tractor side of the vehicle in order to receive the signal from the backup camera mounted on the trailer. However, these dedicated receivers limit which tractor can view the image(s) from which trailer backup camera and/or (in the case of wireless versions) require a complicated pairing process to confirm that the trailer being pulled is in-fact the image that is being displayed on the receiver of the puling vehicle. Otherwise, some camera manufacturers have devised wired means of connecting the trailer camera to the receiver of the pulling vehicle. However, this entails the pulling vehicle and trailer have mating connectors, which complicates installation.

Commonly, most tractors are pulling trailers that are not necessarily owned and maintained by the same entities/companies. For example, tractor owners are usually contracted by trailer owners to pull the trailer to a specified location. The tractor owner is responsible for the maintenance of the tractor and the trailer owner is responsible for the maintenance of the trailer. There is generally little coordination between the trailer owner and the tractor owner. Since semi-trailer backup cameras generally require coordination between these two entities by means of a wireless pairing interface or a wired interface, none have seen any significant success.

The information disclosed in this Background section above is only for enhancement of understanding of the background of the invention and therefore it may contain information that does not form the prior art that is already known to a person of ordinary skill in the art.

SUMMARY

Aspects of embodiments of the invention are directed to trailer backup camera system having a camera-receiver pairing mechanism that can substantially eliminate the need for coordination between a trailer owner and a tractor owner. The camera system may be mounted in place of the center marker light at the top rear of a trailer, and may be powered by the wiring of the center marker light available on the trailer and an internal rechargeable battery. The backup camera system may stream video to a paired mobile device (e.g., a driver's smartphone or tablet) or to a paired device (e.g., an electronic logging device (ELD)) within the cab of a tractor that has had custom software installed using a provided SDK developed for communicating with the camera system.

According to some embodiments of the present invention, there is provided a backup camera system including: a housing configured to be mounted to a back of a trailer at a location of a center marker light of the trailer and having a rear surface offset from and facing away from the trailer; a camera at the housing and configured to capture a rear view of the trailer; a first light at a center of the rear surface of the housing; a second light at the rear surface of the housing and offset from the first light; and a controller within the housing and configured to selectively couple the first light or the second light to a wiring of the center marker light of the trailer.

In some embodiments, the housing is configured to be mounted under a lip at a top rear of the trailer.

In some embodiments, the backup camera system further includes: a switch configured to selectively couple the first light or the second light to the wiring of the center marker light of the trailer based on a control signal from the controller.

In some embodiments, the backup camera system further includes: an accelerometer configured to detect motion of the trailer; and a gyroscope configured to detect a direction of movement of the trailer.

In some embodiments, the controller is further configured to activate the camera in response to detection of reverse movement of the trailer by the gyroscope.

In some embodiments, the backup camera system further includes: a communication circuit configured to broadcast availability of the backup camera system on a mesh network to other devices on the mesh network in response to an activation signal, wherein the controller is further configured to generate the activation signal in response to at least one of: receiving electrical power through the wiring of the center marker light of the trailer; detecting a movement of the trailer by the accelerometer; or detecting a motion of the trailer by the gyroscope.

In some embodiments, the communication circuit includes: a wifi transceiver configured to establish a wireless mesh network and to enable video streaming from the camera to an external device that is on the mesh network; and a bluetooth transceiver configured to communicate a state of health of the backup camera system to at least one of the external device or a telematics gateway of the trailer.

In some embodiments, the communication circuit is configured to communicate with a telematics gateway of the trailer via power line carrier (PLC) protocol.

In some embodiments, the backup camera system further includes: a battery storage within the housing and configured to provide electrical power to the controller, the gyroscope, and the accelerometer in an absence of electrical power on the wiring of the center marker light of the trailer, wherein the controller is configured to charge the battery storage in response to presence of power on the wiring of the center marker light of the trailer.

In some embodiments, the controller is configured to place the backup camera system in hibernate mode in response to one or more of: an absence of power on the wiring of the center marker light of the trailer; a lack of motion detection by at least one of the accelerometer or the gyroscope; and a lack of wireless pairing with any other external device for a period of time.

According to some embodiments of the present invention, there is provided a network of backup camera systems including: a plurality of backup camera systems configured to form a mesh network accessible by a same access credentials, each backup camera system of the plurality of backup camera systems including: a housing configured to be mounted to a back of a trailer; a camera at the housing and configured to capture images of a rear view of the trailer; a communication circuit configured to grant an external device access to the mesh network via the access credentials, and to transmit the images to the external device; and a controller configured to control operations of the camera and the communication circuit.

In some embodiments, the controller is configured to detect a motion of the trailer via an accelerometer or a gyroscope, and the controller is further configured to detect a presence of electrical power at a wiring of a center marker light of the trailer.

In some embodiments, the controller is further configured to generate an activation signal in response to at least one of detection of the motion of the trailer or detection of the presence of electrical power at the wiring of the center marker light, and the communication circuit is further configured to broadcast availability of the backup camera system on the mesh network to other devices on the mesh network in response to the activation signal.

In some embodiments, the housing is mounted at a location of a center marker light of the trailer.

In some embodiments, the network of backup camera systems further includes: a first light at a center of a rear surface of the housing; and a second light at the rear surface of the housing and offset from the first light, wherein the controller is configured to selectively couple the first light or the second light to a wiring of a center marker light of the trailer.

In some embodiments, the backup camera system further includes: a battery storage within the housing and configured to provide electrical power to the backup camera system in an absence of electrical power on a wiring of a center marker light of the trailer, wherein the controller is configured to charge the battery storage in response to presence of power on the wiring of the center marker light of the trailer.

According to some embodiments of the present invention, there is provided a method of wireless communication between a backup camera system and an external device, the method including: broadcasting, by the backup camera system, availability of the backup camera system for pairing with the external device on a wireless network in response to at least one of: receiving electrical power through a wiring of a center marker light of a trailer; detecting a movement of the trailer by an accelerometer; or detecting a motion of the trailer by a gyroscope; receiving access credentials from the external device; and granting the external device access to the wireless network.

In some embodiments, the method further includes: detecting a reverse motion of the trailer by the gyroscope; activating a camera of the backup camera system; and transmitting video data corresponding to a rear view of the trailer to the external device.

In some embodiments, the method of wireless communication further includes: transmitting a state of health of the backup camera system to the external device.

In some embodiments, the method of wireless communication further includes: receiving a command from the external device to capture, save onboard, and/or transmit a still image.

BRIEF DESCRIPTION OF THE DRAWINGS

The accompanying drawings, together with the specification, illustrate exemplary embodiments of the present invention, and, together with the description, serve to explain aspects of embodiments of the present invention. In the drawings, like reference numerals are used throughout the figures to reference like features and components. The figures are not necessarily drawn to scale. The above and other features and aspects of the present invention will become more apparent from the following detailed description of illustrative embodiments thereof with reference to the attached drawings, in which:

FIGS. 2C and 2D illustrate the front and rear views, respectively, of the backup camera system, according to some embodiments of the present invention; and FIGS. 2E and 2F illustrate the top and side views, respectively, of the backup camera system, according to some embodiments of the present invention.

FIG. 4 is a flow diagram illustrating the process of communicating between the backup camera system and the external device, according to some embodiments of the present invention.

DETAILED DESCRIPTION

The detailed description set forth below in connection with the appended drawings is intended as a description of illustrative embodiments of a trailer backup camera system in accordance with the present invention, and is not intended to represent the only forms in which the present invention may be implemented or utilized. The description sets forth the features of the present invention in connection with the illustrated embodiments. It is to be understood, however, that the same or equivalent functions and structures may be accomplished by different embodiments that are also intended to be encompassed within the spirit and scope of the present invention. As denoted elsewhere herein, like element numbers are intended to indicate like elements or features.

Figure 1:
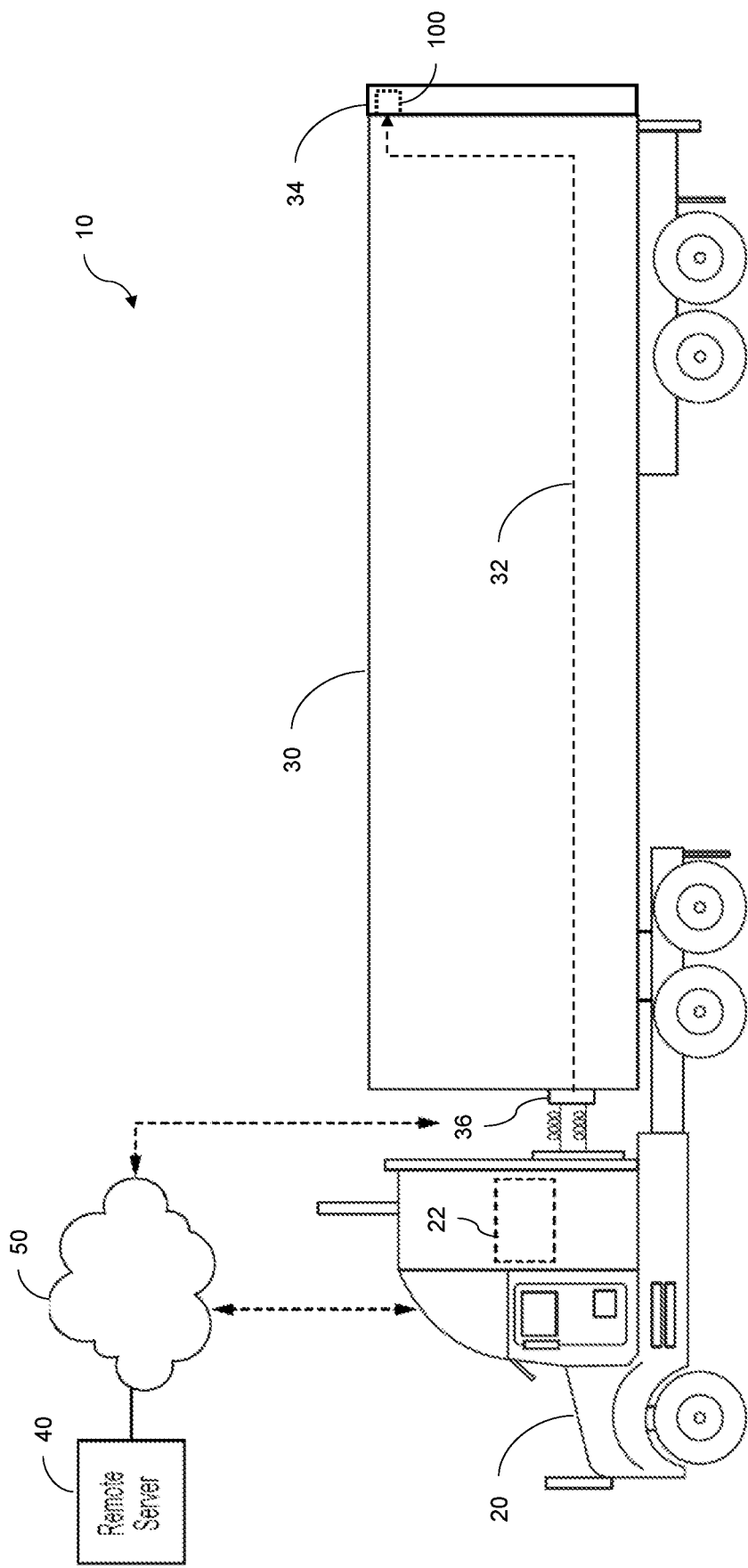
FIG. 1 illustrates a vehicle utilizing a backup camera system, according to some embodiments of the present invention.

FIG. 1 illustrates a vehicle utilizing a backup camera system, according to some embodiments of the present invention.

As illustrated in FIG. 1, the heavy-duty vehicle 10 includes a tractor 20 coupled to a trailer 30 that has installed a backup camera system 100 at its rear to provide a visualization (e.g., via image or video capture) of the rear of the trailer 30.

In some embodiments, the backup camera system 100 is electrically coupled to the electrical system of the trailer 30 and is capable of being electrically powered from the wiring 32 of the center marker light at the top rear of the trailer 30. In some examples, the backup camera system 100 may include an internal battery (e.g., a rechargeable battery) that can power operations of the backup camera system 100 when no power is being provided by the electrical system of the trailer 30.

In some examples, the backup camera system 100 is positioned to be protected by a metal lip 34 protruding from the back of the trailer 30, which extends along at least the top side of the trailer 30. As shown in FIG. 1, the lip 34 may also extend along the sides of the rear of the trailer 30. The lip 34 serves to protect the marker lights at the back of the trailer (e.g., the top rear of the trailer 30) from damage when the trailer 30 backs into a docking bay. By mounting the backup camera system 100 under the lip 34 at the top rear of the trailer, the backup camera system 100 may be protected against docking damage and damage from snow scrapers that may be used to scrape snow and ice off of the top of the trailer 30, and may be least partially protected from the elements (e.g., rain, snow, etc.). Further, the high mount position of the backup camera system 100 provides high (and generally unobstructed) visibility of the back of the trailer, which increases the usability of the backup camera system 100.

In examples in which the trailer 30 is equipped with a telematics gateway (e.g., a telematics gateway circuit) 36, the backup camera system 100 may directly communicate with and transmit data to a telematics gateway 36 (which may be at the nose box of the trailer 30) via a power line carrier (PLC) connection over the wiring 32 of the central light marker. However, embodiments of the present invention are not limited thereto, and the backup camera system 100 may communicate with the telematics gateway 36 via a controller area network (CAN) bus of the trailer 14, an RS232/485 connection, Wi-Fi, Bluetooth, or any other connection via a suitable protocol. The telematics gateway 36 may in turn transmit the data from the backup camera system (e.g., the captured image(s)/video) via cellular or broadband connection to a remote server 40 (e.g., a remote server 40 on the cloud 50) for monitoring, compiling, and/or further processing.

According to some embodiments, the backup camera system 100 is configured to communicate with the tractor 20 via PLC broadcasting. For example, the telematics gateway 36 may include a PLC broadcaster that can transmit the data received from the backup camera system 100 (e.g., via PLC over the wiring 32 of the central marker light) to a device (e.g., a receiver) 22 within the tractor 20. The device 22 may be an on-dash/in-cab electronic logging device (ELD), a display device within the cab, a tablet, a mobile device, and/or the like.

In some embodiments, the backup camera system 100 has a corresponding downloadable application for a smart phone, tablet or other Bluetooth and wifi capable device. A user (e.g., a driver) of a tractor can download the application to pair with the backup camera system 100 and to use the backup camera image on-demand from their mobile device.

In some embodiments, the backup camera system 100 also has a corresponding SDK (software development kit) that ELD providers can use to enable their ELD device to display the backup camera image after pairing with the backup camera system 100. Tractors in the US are governmentally mandated to utilize ELD device in-cab to monitor their HOS (hours of service). In some examples, the ELD device may be incorporated in a dash-mounted device with a display screen that is capable of running sophisticated software and include WiFi and Bluetooth functionality. The ELD service provider may utilize the SDK of the backup camera system 100 to incorporate the functionality of the backup camera into the ELD device. Additionally, tractor owners/operators may decide (or already have) to add an additional screen to the dashboard of their trucks via a tablet or similar device. In this instance, the provided mobile app or SDK can be used to retrieve the streaming image from the backup camera system 100.

According to some embodiments, the backup camera system 100 is equipped with wireless communication capabilities that allow it to wirelessly pair with and communicate with an external device (e.g., a smart phone, tablet, etc.) wirelessly. This may be of particular value in situations where a trailer 30 is not equipped with a PLC broadcaster.

Figure 2B:
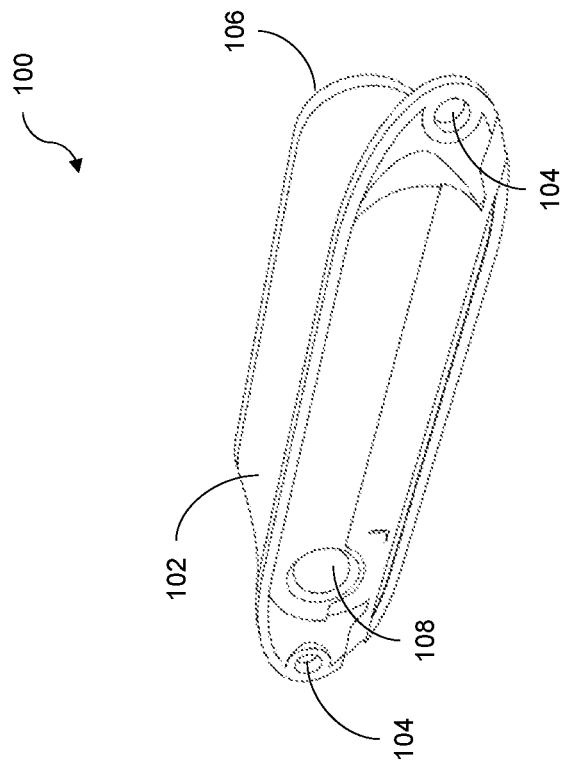
FIGS. 2A and 2B illustrate the front and rear perspective views, respectively, of the backup camera system, according to some embodiments of the present invention.
Figure 2A:
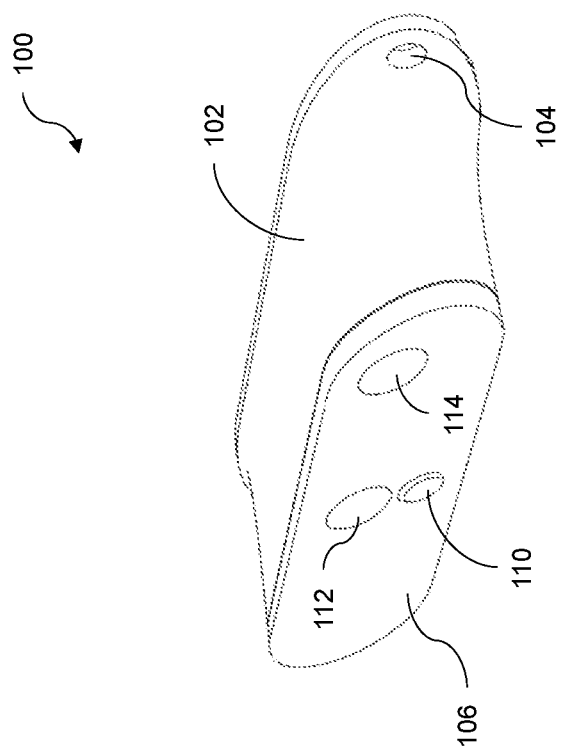

FIGS. 2A and 2B illustrate the front and rear perspective views, respectively, of the backup camera system 100, according to some embodiments of the present invention; FIGS. 2C and 2D illustrate the front and rear views, respectively, of the backup camera system 100, according to some embodiments of the present invention; and FIGS. 2E and 2F illustrate the top and side views, respectively, of the backup camera system 100, according to some embodiments of the present invention.

Referring to FIGS. 2A-2F, in some embodiments, the backup camera system 100 includes a housing 102 that is configured to be mounted to the back of trailer 30 at a location of the center marker light of the trailer 30. The housing 102 may be mounted to the back of the trailer 30 via two fasteners/rivets that pass through mounting holes 104 at opposing sides of the housing 102. In some examples, installing the backup camera system 100 may involve removing the center marker light at the rear of the trailer 30, connecting the wiring of the center marker light to the back of the backup camera system 100 and fastening the housing 102 to the trailer at the location of the center marker light below the lip 34 of the trailer 30. The backup camera system 100 also include a camera 110 at the housing, which is configured to capture a rear view of the trailer 30; a first light (e.g., a first light emitting diode (LED)) 112 at the center of a rear surface of the housing, which is offset from and faces away from the trailer 30; and a second light (e.g., a second LED) 114 at the rear surface of the housing and offset from the first light 112.

The first and second lights 112 and 114, only one of which may be illuminated at any given time, serve as a replacement for the center marker light at the top rear of the trailer 30. Regulations by the Department of Transportation (DOT) require that the center marker light at the rear of the trailer 30 be positioned at the precise center of the back side of the trailer 30. As such, in some examples, the backup camera system 100 is positioned at the center of the rear of the trailer. In such examples, the backup camera system 100 may be programmed to illuminate the first light 112 and to keep off the second light 114 when the trailer is in motion. However, in some examples, the door posts at the back of the trailer may not be symmetrical about the center of the backside of the trailer 30 and the backup camera system 100 may be mounted to be similarly offset from the center of the trailer rear. In such examples, the backup camera system 100 may be programmed to illuminate the second light 114 and to keep off the first light 112, which may be positioned to correspond to the center of the trailer rear. Thus, the first and second lights 112 and 114 may allow an operator to comply with DOT regulations regardless of the door configuration at the back of the trailer 30.

As the backup camera system is mounted high on the trailer 30, the rear surface 106 and the lens of the camera 110 may be angled downward to provide a clear view of the entire surrounding area in the path of the trailer and the immediate rear of the trailer itself.

As shown in FIGS. 2B and 2D, the surface of the backup camera system 100 may have an opening/hole 108 to allow for routing of the wiring of the center marker light to the internal circuits of the backup camera system 100.

In some embodiments, the material making up the housing 102 may include glass-filled nylon; however, embodiments of the present invention are not limited thereto, and the housing 102 may include any suitable material.

Figure 3:
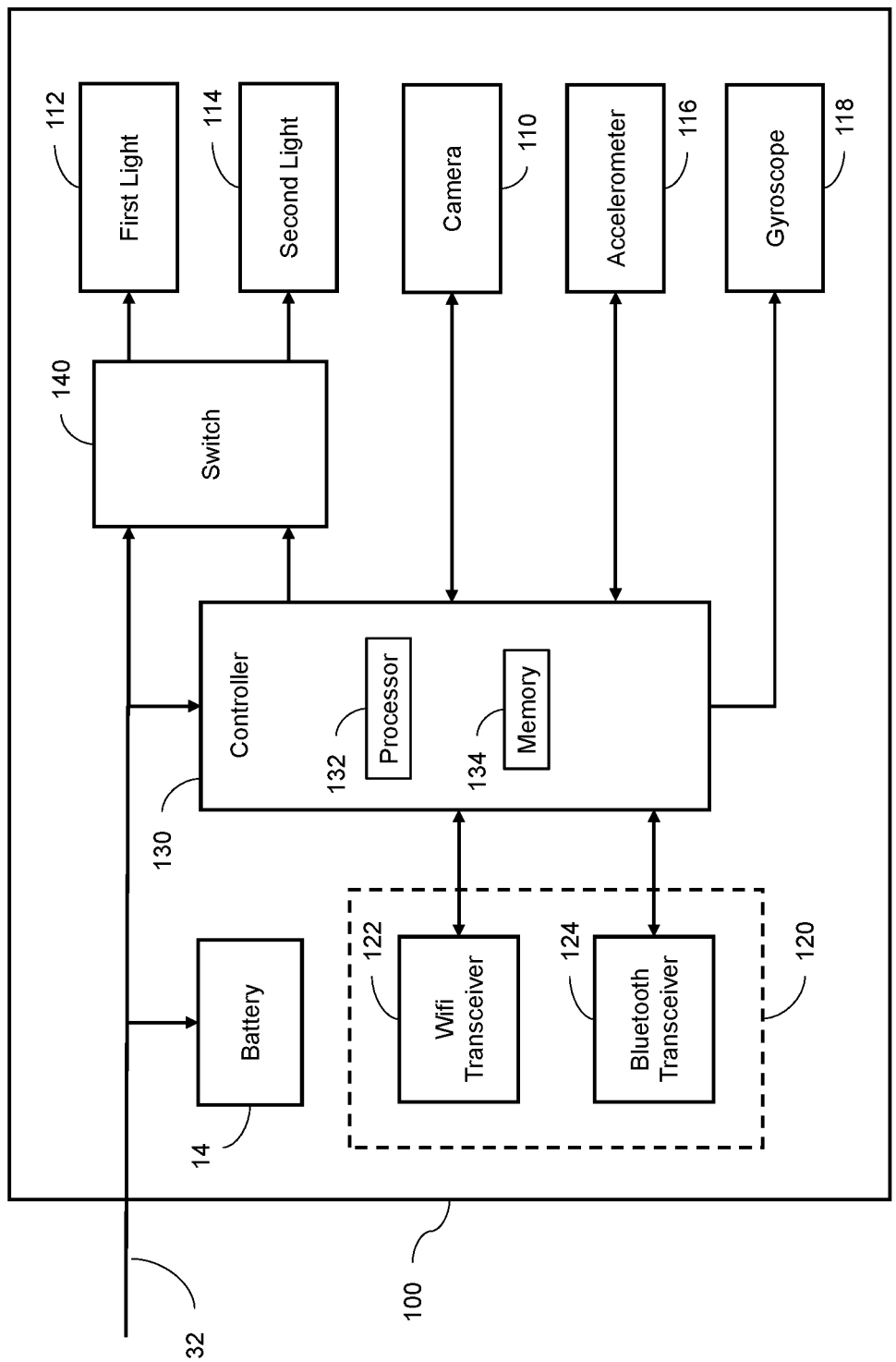
FIG. 3 illustrates a block diagram of the backup camera system, according to some embodiments of the present invention.

FIG. 3 illustrates a block diagram of the backup camera system 100, according to some embodiments of the present invention.

Referring to FIG. 3, according to some embodiments, the circuitry of the backup camera system 100 includes an accelerometer 116 for detecting motion of the trailer 30 to which the backup camera system 100 is mounted; a gyroscope (or a two-axis motion sensor) 118 for detecting the direction of movement of the trailer 30; a communication circuit 120 for communicating data with an external device; and a controller 130 for controlling the operations of the constituent components of the backup camera system 100.

For example, the controller 130 may selectively couple the first light 112 or the second light 114 to the wiring 32 of the center marker light of the trailer. In some embodiments, the backup camera system 100 further includes a switch 140 that is configured to selectively couple the first light 112 or the second light 114 to the wiring 32 based on a control signal from the controller 130. In some examples, the controller 130 may be programmed at the time of mounting the housing 102 to utilize a particle one of the first and second lights 112 and 114 depending on the mounting position. As such, during operation, no more than one of the first and second lights 112 and 114 may be illuminated at any given time.

In some embodiments, when the electrical system of the trailer 30 is powered (e.g., when the tractor 20 is coupled to the trailer 30), the backup camera system 100 may draw electrical power from the wiring 32 of center marker light. The backup camera system 100 may further include a battery storage (e.g., an internal battery) 142 that supplies electrical power to the internal circuitry of the backup camera system 100, such as the controller 130, the accelerometer 116, and the gyroscope 118, in the absence of electrical power on the wiring 32 of the center marker light of the trailer. The controller 130 may be configured to charge the battery storage 142 when power is present on the wiring 32 of the center marker light of the trailer 30.

The backup camera system 100 utilizes the input from the accelerometer 116 and the gyroscope 118 to determine the state of operation. For example, the controller 130 may place the backup camera system 100 in hibernate mode (e.g., low power mode) in response to the absence of power on the wiring 32 (which may indicate disconnection of the tractor 20 and trailer 30), a lack of motion detection by either of the accelerometer and the gyroscope, and/or a lack of wireless pairing with any other external device for a period of time (e.g., several minutes). In hibernation mode, the communication circuit 120 may not broadcast any signals in order to minimize power consumption. Conversely, the controller 130 may activate the backup camera system 100 in response to receiving electrical power through the wiring 32, detecting a movement of the trailer by the accelerometer 116 (e.g., the trailer 30 being bumped by a tractor 20), and/or detecting motion of the trailer 30 by the gyroscope 118.

While sensing movement by either of the accelerometer 116 or gyroscope 118 may be sufficient to determine motion of the trailer 30, combining the sensory outputs of both makes the determination that the trailer 30 has been coupled to a tractor 20 and is being driven away more robust. For example, while the accelerometer 116 may detect a trailer "bump", that sudden movement that is sensed does not necessarily indicate that a tractor 20 has coupled to the trailer 30 and may be due to some other impact. Further, while the gyroscope 118 can indicate forward or reverse movement of the trailer, a certain amount of sustained movement is needed before its sensory output can be trusted. However, a positive movement detection by the accelerometer 116 followed by motion detection by the gyroscope 118 (after a short period of time) can significantly increase the confidence level that the trailer 30 is being driven away by a tractor 20 and that the controller 130 should initiate pairing with the device 22.

As part of initiating the activation of the backup camera system 100 the controller 130 generates and activation signal that causes the communication circuit 120 to broadcast availability of the backup camera system 100 on a mesh network. This makes the backup camera system 100 visible to other devices within range of the mesh network. The backup camera system 100 may pair with a device 22 by receiving the correct access credentials from the external device 22, and then granting the external device 22 access to the mesh network and thus the imagery captured by the backup camera system 100 via the communication circuit 120.

The communication circuit 120 allows the backup camera system 100 to act as both a host and client on the mesh network. When the backup camera system 100 is the only one on the mesh network, the backup camera system 100 acts as a host that can assign an IP address to a client, i.e., an external device 22, and establish communication with the device 22.

All backup camera systems 100 may be configured, at the time of manufacture, to establish a mesh network that has the same name and is accessible via the same credentials. When more than one backup camera systems 100 are present within the vicinity of one another (such as when several trailers equipped with the backup camera system 100 are present in a trailer yard), they form a network of backup camera systems in which the systems 100 arbitrate with one another to determine which will serve as a host while others act as clients. Programming all backup camera systems 100 to generate the same network with the same credentials makes use of the backup camera systems 100 much more user friendly. For example, once a device 22 of a tractor driver pairs with one backup camera system 100 of a trailer 30, the same device 22 may automatically pair with any other backup camera system 100 of any trailer within its vicinity without having to select the corresponding network and entering the requisite credentials (e.g., network password). This allows a driver to pull different trailers and communicate with their backup camera systems 100 without having to actively connect to the camera systems 100.

In a situation where multiple camera systems 100 are broadcasting as available (as may occur in a busy trailer yard), the software provided as part of the mobile app or SDK of the external device (e.g., receiver) 22 may scan the broadcasts coming from identified camera systems 100 in the area and may attempts to correlate the motion of the external device 22 (e.g., motion of the tractor 20 within which lies the device 22) with that of the available camera systems 100 to establish which camera system 100 (or trailer 30) was recently connected to. Once motion starts, the mobile app or SDK may again attempt to correlate the motion reported from the camera system 100 to that of the device 22 to establish which camera system 100 (or trailer 30) has been connected to. Further, as over-the-road movement begins, the device 22 may continuously re-check to confirm that the camera system 100 connected to remains as the most certain possibility of that which was connected. In circumstances where certainty is less than a threshold (e.g., 80%), the user/driver may be asked to select from a list of available camera systems 100.

Once the backup camera system 100 is paired with an external device 22, the controller 130 may activate the camera 110 in response to detection of reverse movement of the trailer 30 by the gyroscope 118 to enable a user of the external device (e.g., the driver of tractor 20) to view the rear of the trailer 30.

According to some embodiments, the communication circuit 120 includes a wifi transceiver 122 and a bluetooth transceiver 124, which enable wireless communication of the backup camera system 100. In some examples, the higher throughput of the wifi transceiver 122 enables video streaming to an external device 22, while the bluetooth transceiver 124 may be utilized for programming configuration settings and facilitating diagnostics. For example, the backup camera system 100 may utilize the bluetooth transceiver 124 to provide the state of health of the camera system 100 or one or more images captured by the camera system 100 to the telematics gateway for communication to a remote server 40. In some examples, when the backup camera system 100 detects a hard impact (such as a crash), the camera system 100 may transmit images/video from the time of impact to the external device 22 and/or the telematics gateway 36.

The controller 130 may include a processor (e.g., a processing circuit) 132 and a memory 134 that has instructions stored thereon that when executed by the processor 132 allow it to perform the operations of the controller 130. As used herein, the term "processor" or "processing circuit" includes any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

FIG. 4 is a flow diagram illustrating the process 400 of communicating between the backup camera system 100 and the external device 22, according to some embodiments of the present invention.

In some embodiments, the backup camera system broadcasts availability for pairing with the external device on a mesh network in response to at least one of: receiving electrical power through a wiring of a center marker light of a trailer; detecting a movement of the trailer by an accelerometer 116; or detecting a motion of the trailer by a gyroscope 118 (S402).

The backup camera system 100 then pairs with the external device 22 by receiving access credentials from the external device 22 (S404), and granting the external device 22 access to the mesh network (S406).

Once paired, in some embodiments, the backup camera system 100 further detects a reverse motion of the trailer 30 by the gyroscope 118, activates the camera 110 of the backup camera system 100, and transmits video data corresponding to a rear view of the trailer 30 to the external device 22. Additionally, the backup camera system 100 transmits a state of health of the backup camera system 100 to the external device 22. The backup camera system 100 may also receive a command from the external device 22 to capture, save onboard (save in memory 134), and/or transmit a still image.

As described above, the backup camera system 100 offers a simple-to-install solution that eliminates the need for a tractor driver to connect a physical connector or interrogate a unique identifier of the camera in order to pair a receiver (e.g., mobile device, ELD, etc.) to the camera of the trailer that is currently being pulled. The backup camera system 100 may replace the center marker light of the trailer rear and be powered by the electrical wiring of the center marker light. The backup camera system 100 may be placed under a lip protruding out of the back of the trailer and extending along a top edge of the trailer, which protects the camera system 100 from docking damage and from the elements.

The present invention is not to be limited in scope by the specific embodiments described herein. Indeed, other various embodiments of and modifications to the invention, in addition to those described herein, may be apparent to those of ordinary skill in the art from the foregoing description and accompanying drawings. Thus, such other embodiments and modifications are intended to fall within the scope of the invention. Further, although the invention has been described herein in the context of a particular implementation in a particular environment for a particular purpose, those of ordinary skill in the art may recognize that its usefulness is not limited thereto and that the invention may be beneficially implemented in any number of environments for any number of purposes. Accordingly, the claims set forth below should be construed in view of the full breadth and spirit of the invention as described herein and equivalents thereof.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

For the purposes of this disclosure, "at least one of X, Y, or Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The backup camera system and/or any other relevant devices or components according to embodiments of the invention described herein may be implemented utilizing any suitable hardware, firmware (e.g., an application-specific integrated circuit), software, or a suitable combination of software, firmware, and hardware. For example, the various components of the backup camera system may be formed on one integrated circuit (IC) chip or on separate IC chips. Further, the various components of the backup camera system may be implemented on a flexible printed circuit film, a tape carrier package (TCP), a printed circuit board (PCB), or formed on a same substrate. Further, the various components of the backup camera system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

What is claimed is:

1. A backup camera system comprising:
   a housing configured to be mounted to a back of a trailer at a location of a center marker light of the trailer and having a rear surface offset from and facing away from the trailer;
   a camera at the housing and configured to capture a rear view of the trailer;
   a first light at a center of the rear surface of the housing;
   a second light at the rear surface of the housing and offset from the first light;
   a switch within the housing and configured to selectively couple the first light or the second light to a wiring of the center marker light of the trailer so that no more than one of the first and second lights is illuminated at any given time based on a control signal, the wiring of the center marker light being an only source of electrical power to the first and second lights from an electrical system of the trailer; and
   a controller within the housing and configured to generate the control signal to selectively couple the first light or the second light based on a mounting position of the housing relative to a center of the back of the trailer.

2. The backup camera system of claim 1, wherein the housing is configured to be mounted under a lip at a top rear of the trailer.

3. The backup camera system of claim 1, further comprising:
   an accelerometer configured to detect motion of the trailer; and
   a gyroscope configured to detect a direction of movement of the trailer.

4. The backup camera system of claim 3, wherein the controller is further configured to activate the camera in response to detection of reverse movement of the trailer by the gyroscope.

5. The backup camera system of claim 3, further comprising:
   a communication circuit configured to broadcast availability of the backup camera system on a mesh network to other devices on the mesh network in response to an activation signal,
   wherein the controller is further configured to generate the activation signal in response to at least one of:
      receiving electrical power through the wiring of the center marker light of the trailer;
      detecting a movement of the trailer by the accelerometer; or
      detecting a motion of the trailer by the gyroscope.

6. The backup camera system of claim 5, wherein the communication circuit comprises:
   a wifi transceiver configured to establish a wireless mesh network and to enable video streaming from the camera to an external device that is on the mesh network; and
   a bluetooth transceiver configured to communicate a state of health of the backup camera system to at least one of the external device or a telematics gateway of the trailer.

7. The backup camera system of claim 5, wherein the communication circuit is configured to communicate with a telematics gateway of the trailer via power line carrier (PLC) protocol.

8. The backup camera system of claim 3, further comprising:
   a battery storage within the housing and configured to provide electrical power to the controller, the gyroscope, and the accelerometer in an absence of electrical power on the wiring of the center marker light of the trailer,
   wherein the controller is configured to charge the battery storage in response to presence of power on the wiring of the center marker light of the trailer.

9. The backup camera system of claim 3, wherein the controller is configured to place the backup camera system in hibernate mode in response to one or more of:
   an absence of power on the wiring of the center marker light of the trailer;

a lack of motion detection by at least one of the accelerometer or the gyroscope; and
a lack of wireless pairing with any other external device for a period of time.

* * * * *